E. R. WAGNER.
VEHICLE WHEEL HUB.
APPLICATION FILED APR. 8, 1920.
1,400,112.
Patented Dec. 13, 1921.
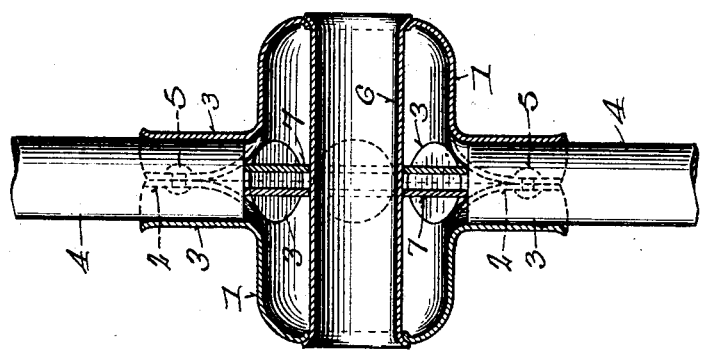
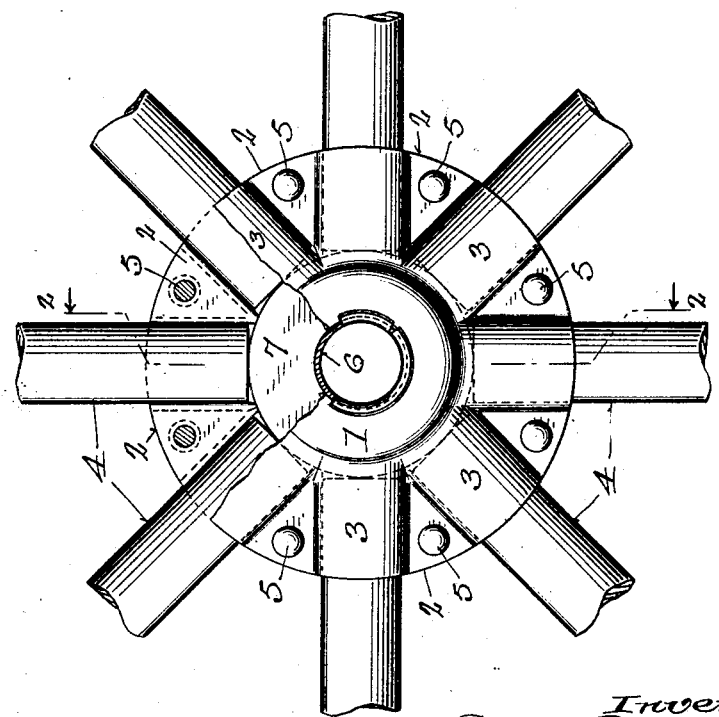
Inventor:
Edward R. Wagner,
By Bottum, Bottum, Hudnall & Lecher
Attorneys.

UNITED STATES PATENT OFFICE.

EDWARD R. WAGNER, OF MILWAUKEE, WISCONSIN, ASSIGNOR TO E. R. WAGNER MANUFACTURING COMPANY, OF NORTH MILWAUKEE, WISCONSIN, A CORPORATION OF WISCONSIN.

VEHICLE-WHEEL HUB.

1,400,112.      Specification of Letters Patent.      Patented Dec. 13, 1921.

Application filed April 8, 1920. Serial No. 372,188.

*To all whom it may concern:*

Be it known that I, EDWARD R. WAGNER, a citizen of the United States, residing at Milwaukee, in the county of Milwaukee and State of Wisconsin, have invented certain new and useful Improvements in Vehicle-Wheel Hubs, of which the following is a specification, reference being had to the accompanying drawing, forming a part thereof.

The main objects of this invention are to adapt the design of metal wheel hubs, particularly for children's wagons, to and facilitate their construction of sheet metal, and generally to simplify and improve the construction of such hubs.

It consists in the construction, arrangement and combination of parts as hereinafter particularly described and pointed out in the claims.

In the accompanying drawing like characters designate the same parts in both figures.

Figure 1 is an end elevation of a wheel hub embodying the invention showing the inner ends of spokes inserted therein and a portion of the front section or member broken away; and Fig. 2 is a lengthwise section of the hub on the line 2—2, Fig. 1.

The hub, which may be completely made of sheet metal stampings as shown, comprises two barrel members or sections 1, the design or shape of which may be varied to adapt the hub to spokes of different shapes in cross section, and to axles or axle bearings of different kinds. As shown, the barrel members or sections are formed with symmetrically rounded outer ends having inwardly flanged central openings therein. At their inner ends the members or sections are formed with outwardly projecting flanges 2, which are radially grooved or bent to form sockets 3, for wood spokes 4. The sockets which extend laterally in opposite directions from the meeting plane of the flanges are flared at their outer ends as shown in Fig. 2, to facilitate driving the spokes and to prevent cutting or mutilating them as they are driven into the sockets.

Between the spoke sockets the flanges 2, which are brought together face to face, are securely fastened to each other, as by rivets 5.

A thimble or bearing sleeve 6, which may be fitted to turn directly on an axle spindle or made to accommodate ball or roller bearings, extends axially through the hub barrel and is secured therein at the ends in any suitable manner. As shown, it is flanged outwardly or expanded in the inwardly flanged openings in the ends of the barrel.

To support the spokes 4 at their inner ends and to transmit and distribute the end thrust on the spokes on one side to the spokes on the opposite side of the wheel, and also to limit the extent to which the spokes can be driven into the sockets in the wheel hub and to prevent them from crushing or deforming the thimble or bearing sleeve 6 or the barrel, one or more abutment washers or rings 7 are mounted on the thimble or sleeve or inserted within the barrel opposite the spoke sockets 3. These rings or washers, which may be stamped as shown, from sheet metal and may be formed with flanges around the openings therein or around their peripheries or both, to afford bearings of greater extent on the sleeve or thimble 6, or for the inner ends of the spokes, serve to distribute the inward end thrust of each spoke upon and around the adjacent half or side of the thimble or sleeve and thereby prevent the spokes from crushing, indenting or deforming it.

I claim:

1. A wheel hub comprising two outwardly flanged sheet metal barrel sections, having their flanges secured together and radially grooved to form spoke sockets, and an abutment ring inserted in the barrel opposite the spoke sockets.

2. A wheel hub comprising two outwardly flanged sheet metal barrel sections having their flanges radially grooved to form spoke sockets and fastened together face to face between the sockets, which extend laterally in opposite directions from the meeting plane of the flanges and are flared at their outer ends.

3. A wheel hub comprising two outwardly flanged barrel sections, having their flanges radially grooved to form spoke sockets and fastened together face to face, a sleeve extending axially through the barrel and secured at the ends therein, and an abutment ring mounted on the sleeve within the barrel opposite the spoke sockets.

4. A wheel hub comprising two outwardly flanged sheet metal barrel sections having inwardly flanged central openings in their outer ends, the flanges at their inner ends being secured together and radially grooved to form spoke sockets which extend laterally in opposite directions from the meeting plane of the flanges, and a bearing sleeve extending axially through the barrel and having its ends expanded in the inwardly flanged openings of the barrel.

5. A wheel hub comprising two stamped sheet metal barrel sections formed with rounded outer ends having central openings therein and at their inner ends with outwardly projecting flanges which are radially grooved to form spoke sockets and are riveted together between the sockets, a bearing sleeve extending axially through the barrel and expanded at the ends in the end openings of the barrel, and abutment rings mounted on the sleeve within the barrel opposite the spoke sockets.

In witness whereof I hereto affix my signature.

EDWARD R. WAGNER.